United States Patent
Platus

[11] 4,026,498
[45] May 31, 1977

[54] MOTION SENSOR FOR SPINNING VEHICLES

[75] Inventor: Daniel H. Platus, Los Angeles, Calif.

[73] Assignee: The United States of America as represented by the Secretary of the Air Force, Washington, D.C.

[22] Filed: Aug. 5, 1975

[21] Appl. No.: 602,040

[52] U.S. Cl. .............................. 244/3.23; 244/3.2
[51] Int. Cl.² ............... F42B 15/14; F42B 13/30; F42B 15/10; F41G 9/00
[58] Field of Search ............... 244/3.14, 3.15, 3.23, 244/3.2

[56] References Cited
UNITED STATES PATENTS

| 3,233,848 | 2/1966 | Burne | 244/3.14 |
| 3,411,736 | 11/1968 | Kelly | 244/3.15 |

Primary Examiner—Samuel W. Engle
Assistant Examiner—Thomas H. Webb
Attorney, Agent, or Firm—Joseph E. Rusz; Arsen Tashjian

[57] ABSTRACT

A sensor system that measures flight motions with respect to a classical Euler angle system of coordinates by aligning itself with the plane of total angle of attack via a pendulum mass. The system permits a simple determination of lift and drag for a spinning vehicle at angle of attack whereby the measurements are used as inputs to a flight control system to control the motions of the spinning vehicle.

2 Claims, 3 Drawing Figures

MOTION SENSOR FOR SPINNING VEHICLES

STATEMENT OF GOVERNMENT INTEREST

The invention described herein may be manufactured and used by or for the Government for governmental purposes without the payment of any royalty thereon.

BACKGROUND OF THE INVENTION

This invention relates to a sensor system for measuring the flight motions of a spinning vehicle with respect to a classical Euler angle system of coordinates that aligns itself with the plane of total angle of attack by means of a pendulum mass.

The motion of flight vehicles is usually determined from sensors such as rate gyros and accelerometers rigidly fixed in the vehicles. This has certain advantages for non-spinning vehicles such as aircraft, for which motion perturbations from a steady flight condition are desired in order to control the flight motions with respect to the vehicle axes.

For a spinning, axisymmetric body such as a ballistic reentry vehicle the use of body-fixed motion sensors has some deficiencies. The angles of attack and sideslip and the lateral rates determined from body-fixed sensors are, in general, rapidly varying quantities that oscillate at the body frequencies.

These deficiencies can be avoided by use of a sensor system that rotates in the vehicle and is inertially stabilized with respect to the lift vector or plane of total angle of attack.

SUMMARY OF THE INVENTION

The present invention is concerned with providing a system for angle of attack control of spinning vehicles by means of a pendulum mounted arrangement for developing flight attitude with respect to the lift vector or plane of total angle of attack. The rotating sensor system permits a more accurate measurement of the motion of the spinning vehicle than a system of sensors rigidly fixed in the body as is common in non-spinning vehicles such as aircraft.

Accordingly, it is an object of the invention to provide an improved sensor system that permits a direct measurement of total angle of attack, pitch and yaw rates and normal acceleration in a wind-referenced Euler angle coordinate system.

Another object of the invention is to provide a motion sensor for a spinning vehicle wherein a pendulum is utilized to orient a sensor system with respect to the wind in order to measure directly the motion parameters in the Euler angle coordinate system.

Still another object of the invention is to provide a sensor system which includes, in addition to conventional body-fixed axial acceleration and roll rate sensors, pitch and yaw angular rate sensors and normal acceleration sensor mounted to a pendulum that rotates with respect to the vehicle at the windward meridian rotation rate with is measured directly.

A further object of the invention is to provide a motion sensor for spinning flight vehicles wherein the lift and drag are obtained by directly measuring the windward meridian rotation rate and obtaining the angle of attack directly from the normal acceleration when the normal force derivative is known.

These and other objects, features and advantages will become more apparent after considering the following detailed description taken in conjunction with the annexed drawings and appended claims.

DESCRIPTION OF A PREFERRED EMBODIMENT

Implementation of the angle of attack control system requires a means of generating a wind-fixed control moment and a sensor system to measure the pertinent motion response parameters. Since yaw moment undamping of the angle of attack produces, in general, a rotary windward meridian, the control force must rotate at one of the body frequencies and maintain a fixed orientation with respect to the wind vector or lift plane. This can be accomplished in several different ways by use of a pendulum mass that aligns itself with the lift vector. Any form of trim generator can be either passively stabilized by means of the pendulum mass or it can be motor driven at the windward meridian rotation frequency by using the pendulum to regulate the motor speed at the proper frequency.

Figure 1:
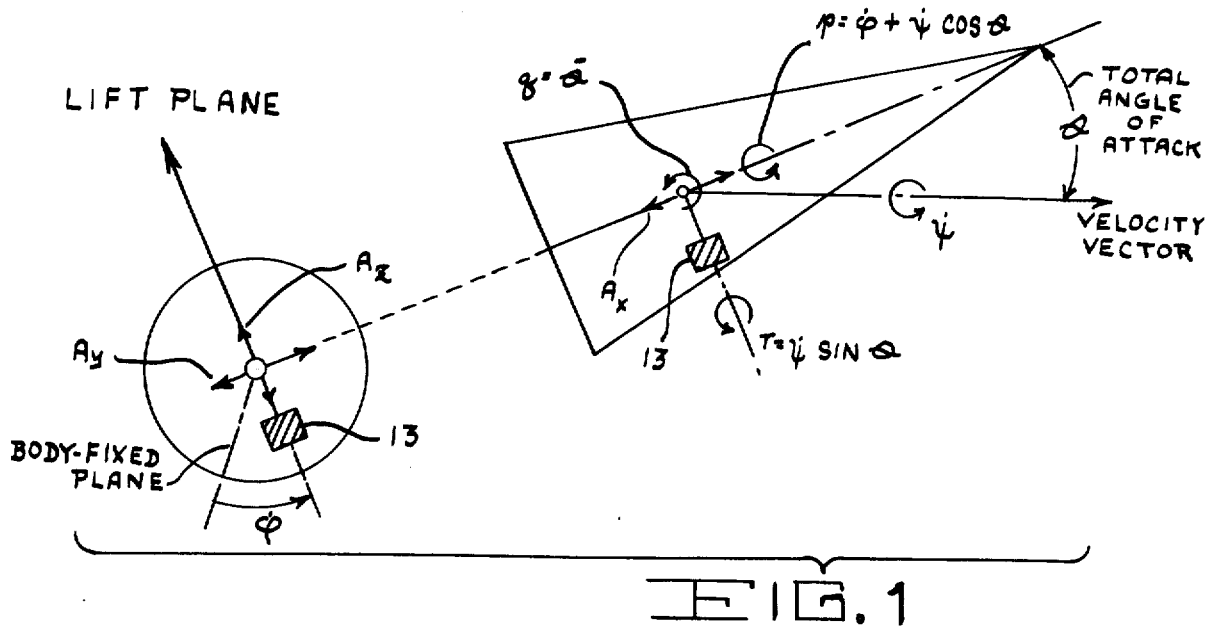
FIG. 1 is an inertia-stabilized sensor system according to the invention wherein a pendulum is utilized to orient the system with respect to the wind to measure directly the motion parameters in the Euler angle coordinate system.

Referring now to FIG. 1, a pendulum 13 is utilized to orient the sensor system with respect to the wind in order to measure directly the motion parameters in the Euler angle (wind referenced) coordinate system. For a complete motion determination of the sensor system shown in FIG. 1, the following quantities are measured:

$p$ = roll rate = $\dot{\phi} + \dot{\psi}\cos\theta$
$q$ = pitch rate = $\dot{\theta}$
$r$ = yaw rate = $\dot{\psi}\sin\theta$
$\dot{\phi}$ = windward meridian rotation rate
$A_x$ = axial acceleration
$A_y$ = normal acceleration perpendicular to plane of total angle of attack
$A_z$ = normal acceleration in plane of total angle of attack In addition to conventional body-fixed axial acceleration and roll rate sensors, pitch and yaw angular rate sensors and a normal acceleration sensor are mounted to the pendulum 13 that rotates with respect to the vehicle at the windward meridian rotation rate $\dot{\phi}$, which is measured directly. The pendulum-mounted rate sensors measure pitch rate. $q = \dot{\theta}$, and yaw rate, $r = \dot{\psi}\sin\theta$, in the Euler angle system. From the definition of roll rate $p = \dot{\phi} + \dot{\psi}\cos\theta$, the angle of attack is obtained simply from the relation $$\theta = \tan^{-1}\left(\frac{r}{p - \dot{\phi}}\right)$$

where $p$, $r$ and $\dot{\phi}$ are measured directly.

Figure 2:
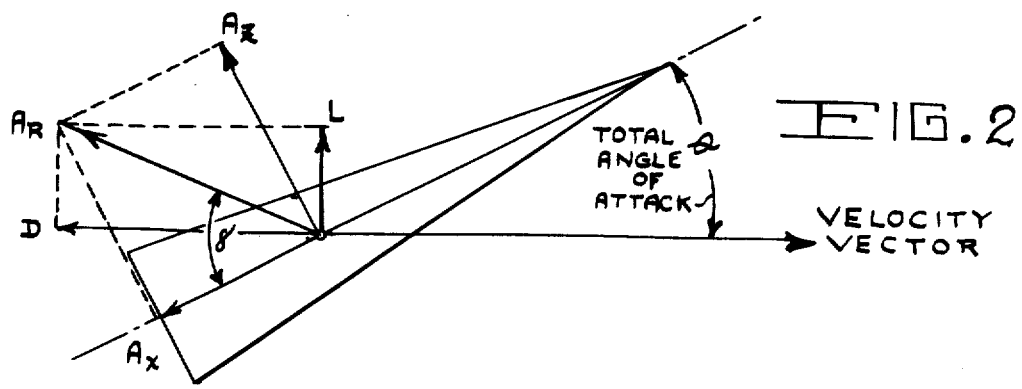
FIG. 2 is a diagram showing the lift and drag resolution which is used to obtain the total angle of attack of the vehicle.

Referring now to FIG. 2, the normal acceleration, $A_z$ in the lift plate is measured directly from the pendulum mounted accelerometer. If the normal force derivative is known with sufficient accuracy, then $A_z$ gives a direct measurement of $\theta$. The resultant acceleration $A_R$ and its orientation angle with respect to the vehicle axis are obtained from a resolution of $A_x$ and $A_z$, according to $$A_R = \sqrt{A_x^2 + A_z^2}$$

$$\gamma = \tan^{-1} \frac{A_z}{A_x}$$

The lift and drag accelerations are then obtained from the relations $$A_D = A_R \cos(\gamma - \theta)$$
$$A_L = A_R \sin(\gamma - \theta)$$

Figure 3:
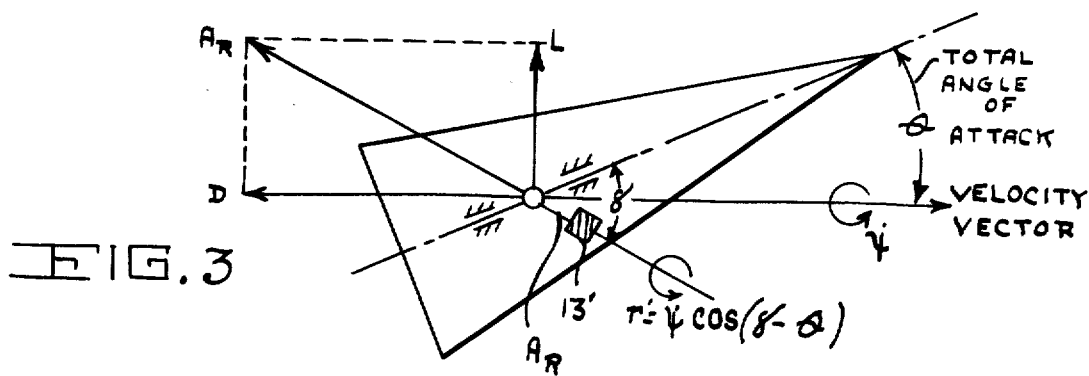
FIG. 3 is another embodiment of the invention showing a gimballed pendulum system which permits the determination of the angle of attack by measuring the resultant acceleration and orientation angle directly with the yaw rate sensor being oriented along the axis of the pendulum.

In the alternative embodiment of the invention which is shown in FIG. 3, $A_R$ and $\gamma$ are measured directly by means of the gimballed pendulum 13'. The yaw rate sensor oriented along the axis of the pendulum 13' measures the angular rate $r'$ defined by $$r' = \dot{\psi} \cos(\gamma - \theta)$$

and the angle of attack is obtained from the relation $$\theta = \tan^{-1} \left[ \frac{\frac{r'}{p - \dot{\phi}} - \cos \gamma}{\sin \gamma} \right]$$

Thus it can be seen that the hereinbefore described rotating sensor system permits a more direct measurement of the motion of spinning missles than a system of sensors rigidly fixed in the body and, as such, the accuracy of the measured quantities is improved. Also, the invention permits a simple determination of lift and drag for spinning flight vehicles at angle of attack. Such measurements are useful in conjunction with a flight control system to control the motion of spinning missiles such as ballistic reentry vehicles.

Although the invention has been described in the foregoing specification and illustrated in the accompanying drawing in terms of preferred embodiments thereof, the invention is not limited to these embodiments or to the preferred systems disclosed. It will be apparent to those skilled in the art that my invention could have extensive use in other operations where it is desirable to provide an inertia-stabilized sensor system for controlling the angle of attack of a spinning missile in space.

Having thus set forth the nature of my invention, what I desire to secure by Letters Patent of the United States is:

1. A motion sensor system for measuring the flight motion parameters of a spinning vehicle with respect to the Euler angle of coordinates comprising a pendulum that rotates with respect to the vehicles at the windward rotation meridian rate, said pendulum being inertially stabilized with respect to the total angle of attack, a yaw angular rate sensor mounted to said pendulum, a normal acceleration sensor mounted to said pendulum for measuring pitch, and axial acceleration and roll rate sensors mounted in body fixed relationship to said vehicle, said rate sensors producing measurements for determining the angle of attack from the relation $$\theta = \tan^{-1} \left( \frac{r}{p - \dot{\phi}} \right)$$

where
$\theta$ = angle of attack
$r$ = yaw rate
$p$ = roll rate
$\dot{\phi}$ = windward meridian rotation rate.

2. The motion sensor system defined in claim 1 including gimbals wherein said pendulum is gimballed to permit the resultant acceleration and its orientation angle to be measured directly to determine the angle of attack from the relation $$\theta = \tan^{-1} \left[ \frac{\frac{r'}{p - \dot{\phi}} - \cos \gamma}{\sin \gamma} \right]$$

where
$\theta$ = angle of attack
$r'$ = yaw rate
$p$ = roll rate
$\dot{\phi}$ = windward meridian rotation rate
$\gamma$ = orientation angle of resultant acceleration.

* * * * *